(12) United States Patent
Hobbs et al.

(10) Patent No.: US 10,448,324 B2
(45) Date of Patent: *Oct. 15, 2019

(54) POWER MANAGEMENT FOR DISTRIBUTED ANTENNA SYSTEM

(71) Applicant: CommScope Technologies LLC, Hickory, NC (US)

(72) Inventors: Neil T. Hobbs, Forest, VA (US); Nelson Christian Schmidt, Jr., Lexington, VA (US); Michael J. Williamson, Clayton, NC (US); Fred William Phillips, Forest, VA (US); Charles B. Morrison, Forest, VA (US); Christopher Goodman Ranson, Concord, VA (US); Thomas Kummetz, Kissing (DE); Matthew Thomas Melester, McKinney, TX (US)

(73) Assignee: CommScope Technologies LLC, Hickory, NC (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/692,662

(22) Filed: Aug. 31, 2017

(65) Prior Publication Data

US 2018/0027492 A1 Jan. 25, 2018

Related U.S. Application Data

(63) Continuation of application No. 14/592,549, filed on Jan. 8, 2015, now Pat. No. 9,769,744.
(Continued)

(51) Int. Cl.
*H04W 4/00* (2018.01)
*H04W 52/02* (2009.01)
(Continued)

(52) U.S. Cl.
CPC ..... *H04W 52/0206* (2013.01); *H04L 41/0833* (2013.01); *H04W 24/02* (2013.01);
(Continued)

(58) Field of Classification Search
CPC ........... H04B 17/00; H04B 7/02; H04L 12/10; H04L 12/24; H04L 41/0816;
(Continued)

(56) References Cited

U.S. PATENT DOCUMENTS 7,392,011 B1 6/2008 Jacomb-Hood
7,907,960 B1 3/2011 Barratt et al.
(Continued)

FOREIGN PATENT DOCUMENTS

CN 101631379 1/2010
KR 20110120806 11/2011
(Continued)

OTHER PUBLICATIONS

European Patent Office, Extended European Search Report from EP Application No. 15770251.5 dated Oct. 5, 2017, dated Oct. 5, 2017, from Foreign Counterpart of U.S. Appl. No. 14/592,549, pp. 1-11, EP.
(Continued)

*Primary Examiner* — Frank Duong
(74) *Attorney, Agent, or Firm* — Fogg & Powers LLC

(57) ABSTRACT

Certain aspects involve power management subsystems for a distributed antenna system ("DAS") or other telecommunication system. The power management subsystem can include a measurement module and an optimization module. The measurement module can monitor a utilization metric for a remote unit in the DAS or other telecommunication system. The power optimization module can determine whether the remote unit is underutilized based on the monitored utilization metric. The power optimization mod-
(Continued)

ule can configure the remote unit for a low-power operation in response to determining that the remote unit is underutilized.

21 Claims, 3 Drawing Sheets

Related U.S. Application Data

(60) Provisional application No. 61/971,610, filed on Mar. 28, 2014.

(51) Int. Cl.
  *H04W 24/02* (2009.01)
  *H04L 12/24* (2006.01)
  *H04L 12/26* (2006.01)

(52) U.S. Cl.
  CPC .......... *H04L 43/0817* (2013.01); *Y02D 70/00* (2018.01); *Y02D 70/1262* (2018.01); *Y02D 70/166* (2018.01)

(58) Field of Classification Search
  CPC ........... H04L 41/0833; H04L 43/0817; H04W 24/02; H04W 52/02; H04W 52/0206; H04W 88/08; H04W 88/085; H04W 88/12; Y02B 60/50
  See application file for complete search history.

(56) References Cited

U.S. PATENT DOCUMENTS

| | | | |
|---|---|---|---|
| 8,213,872 | B2 | 7/2012 | Lambrecht |
| 8,243,848 | B2 | 8/2012 | Ohwatari et al. |
| 8,385,967 | B2 | 2/2013 | Hoole |
| 8,532,580 | B2 | 9/2013 | Elliott et al. |
| 8,634,323 | B2 | 1/2014 | Soriaga et al. |
| 8,638,214 | B2 * | 1/2014 | Kummetz ............. G01S 5/0289 340/517 |
| 8,744,504 | B2 | 6/2014 | Faccin et al. |
| 9,166,690 | B2 | 10/2015 | Brower et al. |
| 9,769,744 | B2 | 9/2017 | Hobbs et al. |
| 2005/0237971 | A1 | 10/2005 | Skraparlis |
| 2010/0234035 | A1 | 9/2010 | Fujishima et al. |
| 2011/0249576 | A1 | 10/2011 | Chrisikos et al. |
| 2012/0149411 | A1 | 6/2012 | Miyoshi et al. |
| 2012/0155446 | A1 | 6/2012 | Machida |
| 2012/0317426 | A1 | 12/2012 | Hunter, Jr. et al. |
| 2013/0095770 | A1 | 4/2013 | Moshfeghi |
| 2013/0128762 | A1 | 5/2013 | Guo |
| 2014/0051348 | A1 | 2/2014 | Chow et al. |
| 2014/0057627 | A1 | 2/2014 | Hejazi et al. |
| 2014/0086082 | A1 | 3/2014 | Kim et al. |
| 2014/0146692 | A1 * | 5/2014 | Hazani ............. H04W 52/0206 370/252 |
| 2014/0233442 | A1 | 8/2014 | Atlas et al. |
| 2015/0382293 | A1 | 12/2015 | Heidler et al. |

FOREIGN PATENT DOCUMENTS

| | | |
|---|---|---|
| WO | 2012051230 | 4/2012 |
| WO | 2013123670 A1 | 8/2013 |

OTHER PUBLICATIONS

United States Patent and Trademark Office, "Advisory Action", "From U.S. Appl. No. 14/592,549", dated Jan. 12, 2017, pp. 1-4, Published in: US.

United States Patent and Trademark Office, "Final Office Action", "From U.S. Appl. No. 14/592,549", dated Nov. 25, 2016, pp. 1-28, Published in: US.

United States Patent and Trademark Office, "Notice of Allowance", "From U.S. Appl. No. 14/592,549", dated May 19, 2017, pp. 1-8, Published in: US.

United States Patent and Trademark Office, "Office Action", "From U.S. Appl. No. 14/592,549", Jun. 29, 2016, pp. 1-22, Published in: US.

International Search Authority, "Interanational Prelimanry Report on Patenability from PCT Application No. PCT/US2015/010580", "from Foreign Counterpart to U.S. Appl. No. 14/592,549", dated Oct. 13, 2016, pp. 1-11, Published in: WO.

International Search Authority, "International Search Report and the Written Opinion for PCT/US2015/010580", "Foreign Counterpart to U.S. Appl. No. 14/592,549", dated Mar. 31, 2015, pp. 1-12, Published in: WO.

Batson et al., "Enhanced Collection Methodology for Distributed Wireless Antenna Systems", 2007, pp. 1-6, Publisher: IEEE.

BTI Wireless, "Distributed Antenna Systems: Extend Coverage, Maximize Performance, Save Space", Jun. 13, 2014, pp. 1-4.

Hejazi et al, "Traffic Monitoring in a LTE Distributed Antenna System", "Cyber Journals: Multidisciplinary Journals in Science and Technology, Journal of Selected Areas in Telecommunications (JSAT)", May 2013, pp. 19-25, vol. 3, Issue 5.

U.S. Patent and Trademark Office, "Advisory Action", U.S. Appl. No. 14/592,549, dated Jan. 12, 2017, pp. 1-4, Published: US.

U.S. Patent and Trademark Office, "Notice of Pre-Appeal Brief Decision", U.S. Appl. No. 14/592,549, dated Mar. 14, 2017, pp. 1-2, Published: US.

European Patent Office, "Extended European Search Report from EP Application No. 19157106.6 dated Jun. 25, 2019", from Foreign Counterpart to U.S. Appl. No. 14/592,549, pp. 1-11, Published: EP.

* cited by examiner

POWER MANAGEMENT FOR DISTRIBUTED ANTENNA SYSTEM

CROSS-REFERENCE TO RELATED APPLICATIONS

This Application is a Continuation Application of U.S. patent application Ser. No. 14/592,549 titled "POWER MANAGEMENT FOR DISTRIBUTED ANTENNA SYSTEM" filed on Jan. 8, 2015, which claims priority to, and the benefit of, U.S. Provisional Application Ser. No. 61/971,610, filed Mar. 28, 2014 and titled "Energy Efficient Distributed Antenna System", the contents of both of which are hereby incorporated by reference.

TECHNICAL FIELD

The present disclosure relates generally to telecommunication systems and more particularly (although not necessarily exclusively) to managing power consumption in distributed antenna systems or other telecommunication systems.

BACKGROUND

A distributed antenna system ("DAS") can be used to provide wireless communications coverage in a variety of environments, particularly in large structures such as office buildings, convention halls, airports, stadiums, and the like. A DAS can include one or more master units or other head-end units that are communicatively coupled to one or more base stations. A DAS can also include multiple remote units that are communicatively coupled to each master unit. The remote units, each of which can include one or more transceivers and antennas, can be distributed across a coverage area. The remote units can transmit the downlink signals to mobile phones or other terminal devices within coverage areas serviced by the remote units.

A DAS or other telecommunication system may include multiple access points in multiple areas. During certain time periods, at least some of the access points may not be utilized by mobile devices or other terminal devices. For example, one or more floors of a building may not be occupied by users of terminal devices outside of business hours. Operating access points in these locations during periods of low utilization can unnecessarily or inefficiently utilize power in the DAS.

SUMMARY

According to one aspect, a method for managing power consumption in a telecommunication system is provided. The method can involve monitoring a utilization metric for one or more remote units in the telecommunication system. The utilization metric can include data indicative of one or more terminal devices being available for communication with the remote unit. The method can also involve determining whether at least one remote unit is underutilized based on the monitored utilization metric for the remote unit. The method can also involve configuring the underutilized remote unit for low-power operation in response to determining that the remote unit is underutilized.

According to another aspect, a power management subsystem is provided for managing power consumption in a telecommunication system. The power management subsystem can include a measurement module and an optimization module. The measurement module can monitor a utilization metric for one or more remote units in the telecommunication system. The utilization metric can include data indicative of one or more terminal devices being available for communication with one or more of the remote units. The optimization module can determine whether at least one of the remote units is underutilized based on the monitored utilization metric. The optimization module can configure the underutilized remote unit for a low-power operation in response to determining that the remote unit is underutilized.

According to another aspect, a distributed antenna system configured for managing power consumption is provided. The distributed antenna system can include multiple remote units and a unit that can communicate with the remote units and a base station. The remote units can wirelessly communicate with terminal devices in a coverage zone. Each remote unit can include at least one utilization detection device for detecting data indicative of a respective utilization metric for the remote unit. The utilization metric can include data indicative of one or more terminal devices being available for communication with the remote unit. The unit can monitor the utilization metrics and determine whether at least one of the remote units is underutilized based on at least one of the monitored utilization metrics. The unit can configure the underutilized remote unit for a low-power operation.

These illustrative aspects and features are mentioned not to limit or define the disclosure, but to provide examples to aid understanding of the concepts disclosed in this application. Other aspects, advantages, and features of the present disclosure will become apparent after review of the entire application.

DETAILED DESCRIPTION

Figure 1:
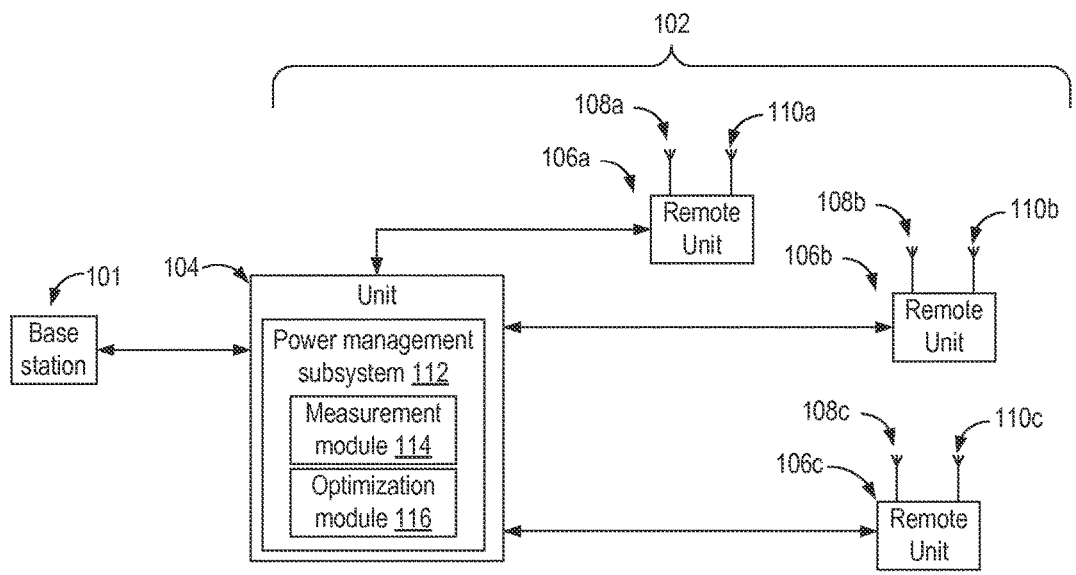
FIG. 1 is a block diagram depicting an example of a distributed antenna system ("DAS") that can include a power management subsystem according to one aspect of the present disclosure.

Certain aspects and features relate to a power management subsystem that can be used for managing power consumption in a distributed antenna system ("DAS") or other telecommunication system. The power management subsystem can utilize one or more techniques for improving energy efficiency without negatively impacting coverage for potential users of the DAS or other telecommunication system. For example, the power management subsystem can determine whether one or more remote units of the DAS are to be configured for low-power operation based on the utilization of the remote units or other attributes of the operating environment in which the DAS is deployed.

In accordance with some aspects, the power management subsystem can monitor a utilization metric for one or more remote units in the DAS. The utilization metric can include data that indicates whether one or more terminal devices are available for communication with one or more remote units. In some aspects, a utilization metric can include data that indicates activity detected by one or more sensors. In one example, a sensor can detect a terminal device. In another example, a sensor can detect the presence of a user who may or may not utilize a terminal device. In additional or alternative aspects, a utilization metric can include data that indicates an amount of bandwidth used by one or more terminal devices. In additional or alternative aspects, a utilization metric can include data that indicates a data rate used by one or more terminal devices. The power management subsystem can use the utilization metric to determine whether one or more of the remote unit are underutilized. For example, a remote unit may be underutilized if the amount of uplink traffic being received via the remote unit is less than a threshold amount of uplink traffic. The power management subsystem can configure one or more underutilized remote units for low-power operation. In one example, a power management subsystem that is communicatively coupled to a remote unit may transmit a control signal to the remote unit over a communication link that instructs the remote unit to enter a low-power mode. Non-limiting examples of the low-power mode include an "off" state, a sleep mode in which circuitry used to communicate with mobile devices is powered off, a mode in which the remote unit uses fewer than all of the available frequency bands or channels for communicating with mobiles devices, etc.

One or more types of data can be used, either alone or in combination, to obtain a utilization metric. One example of data used to obtain a utilization metric is uplink traffic that is measured or otherwise detected by a measurement receiver. Another example of data used to obtain a utilization metric is data obtained by a sensor device (e.g., a motion sensor). In some aspects, a combination of detected uplink traffic data and detected motion data can be used to determine or otherwise obtain a utilization metric. For example, the detection of motion data alone may not indicate that a user present in a coverage zone is actually operating a terminal device that would necessitate operating a remote unit in a high-power mode. Additionally or alternatively, detection of uplink traffic alone may not indicate a terminal device is being operated by a user if, for example, the terminal device has simply been left behind by a user and periodically transmits a pilot signal. Combining different types of data (e.g., motion data and uplink traffic data) can result in a utilization metric indicating that a terminal device is both located in a coverage zone and being used in the coverage zone.

The power management subsystem can be used to reduce energy consumption by the DAS. Reducing energy consumption by the DAS can result in reduced operating costs. Reducing energy consumption by the DAS can also increase the system reliability of the DAS by, for example, lowering operating temperatures for one or more devices of the DAS. Lowering the operating temperatures for one or more devices of the DAS can also reduce audible noise emitted by the DAS by, for example, reducing the need to operate cooling fans.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

FIG. 1 is a block diagram depicting an example of a DAS 102 that can include a power management subsystem 112. The DAS 102 can communicate signals between one or more base stations 101 or other transceiving devices (e.g., repeaters) in communication with the DAS 102 and terminal devices in one or more coverage zones serviced by the DAS 102. Terminal devices can be electronic devices used to communicate one or more of voice and data via a telecommunication system. The DAS 102 can communicate signals to terminal devices via a unit 104 (e.g., a master unit, a base station router, etc.) and remote units 106a, 106b, 106c that service one or more coverage zones. The unit 104 can be communicatively coupled with the remote units 106a, 106b, 106c in any suitable manner. Communicatively coupling devices in a DAS 102 or other telecommunication system can involve establishing, maintaining, or otherwise using a communication link (e.g., a cable, an optical fiber, a wireless link, etc.) to communicate information between the devices.

The unit 104 can receive downlink signals from the base stations 101 and transmit uplink signals to the base stations 101. Any suitable communication link can be used for communication between the base station 101 and a unit 104. A suitable communication link can be a wired connection or a wireless connection. A wired connection can include, for example, a connection via a copper cable, an optical fiber, or another suitable communication medium. A wireless connection can include, for example, a wireless RF communication link or a microwave link.

In some aspects, the unit 104 can be a master unit or other suitable unit that can communicate with one or more base stations 101 or other transceiving devices in communication with the DAS 102. A master unit can include, for example, an optical transceiver that transmits optical signals to remote units 106a, 106b, 106c in a DAS 102. The master unit or other suitable unit 104 can communicate with remote units 106a, 106b, 106c in different coverage zones of the same DAS 102. In additional or alternative aspects, the unit 104 can be included in a base station router or other suitable unit that can communicate signals between one or more base stations 101 and one or more master units. In additional or alternative aspects, the unit 104 can be included in an extension unit or other suitable unit that can communicate signals between one or more master units and the remote units 106a, 106b, 106c.

The remote units 106a, 106b, 106c can provide signal coverage in one or more coverage zones. The remote units 106a, 106b, 106c can include transceiving devices that can include or be communicatively coupled to one or more antennas. Providing signal coverage in the coverage zones can include wirelessly transmitting downlink signals received from the unit 104 to terminal devices in the coverage zones. Providing signal coverage in the coverage zones can also include wirelessly receiving uplink signals from the mobile communication devices or other terminal devices in the coverage zones. The remote units 106a, 106b, 106c can transmit the uplink signals to the unit 104.

The remote units 106a, 106b, 106c can respectively include transmitter antenna elements 108a, 108b, 108c. The transmitter antenna elements 108a, 108b, 108c can be used to transmit wireless signals to terminals devices. The remote units 106a, 106b, 106c can also respectively include receiver antenna elements 110a, 110b, 110c. The receiver antenna elements 110a, 110b, 110c can be used to transmit wireless signals to terminals devices.

For illustrative purposes, each of the remote units 106a, 106b, 106c is depicted in FIG. 1 as including a single transmitter antenna element and a single receiver antenna element. However, a remote unit can include any number of transmitter antenna elements and receiver antenna elements. In one example, a remote unit that is configured for single-input/single-output ("SISO") operation can use one transmitter antenna element for transmitting downlink signals and one receiver antenna element for receiving uplink signals. In another example, a remote unit that is configured for multiple-input/multiple-output ("MIMO") operation can use multiple transmitter antenna elements to transmit signals to the same terminal device and can use multiple receiver antenna elements to receive signals from the terminal device.

In some aspects, a remote unit having multiple transmitter antenna elements and multiple receiver antenna elements can be configured to operate in a SISO mode and in a MIMO mode. In the SISO mode, the remote unit can use each antenna element for communication with a different terminal device. In the MIMO mode, the remote unit can use multiple antenna elements for communication with the same terminal device.

In additional or alternative aspects, one or more of the remote units 106a, 106b, 106c can use the same antenna element for transmitting and receiving signals. For example, a remote unit configured for time-division duplexing operation may use the same antenna element or set of antenna elements for transmitting signals during a first time period and for receiving signals during a second time period.

Although FIG. 1 depicts a direct connection between the unit 104 and the remote units 106a, 106b, 106c, other implementations are possible. In some aspects, the unit 104 can be communicatively coupled to the remote units 106a, 106b, 106c via one or more extension units or other intermediate devices.

Although FIG. 1 depicts one unit 104 and three remote units 106a, 106b, 106c, a DAS 102 can include any number of units 104 and any number of remote units.

The DAS 102 can include a power management subsystem 112. The power management subsystem 112 can be used to reduce inefficient power usage by the DAS. For example, the remote units 106a, 106b, 106c may be configured to communicate on five frequency bands, each of which is associated with a respective amount of bandwidth used for the frequency band. During a given time period, the remote units 106a, 106b may communicate signals with terminal devices in all five frequency bands, and the remote unit 106c may communicate signals with terminal devices in one of the five frequency bands. The remote unit 106c may therefore be underutilized. The remote units 106a, 106b, 106c may consume the same amount of power during the time period, which may be undesirable if the remote unit 106c is underutilized.

The power management subsystem 112 can perform one or more actions to reduce power usage by the DAS 102 based on determining or otherwise identifying that a remote unit is underutilized. For example, the power management subsystem 112 can determine that reduced uplink traffic is being received via the remote unit 106c as compared to the remote units 106a, 106b. In response to determining that reduced uplink traffic is being received via the remote unit 106c, the power management subsystem 112 can transmit or otherwise provide a control signal to the remote unit 106c that causes the remote unit 106c to operate in a low-power mode. In the event that the utilization of the remote unit 106c subsequently increases or the utilization of the remote units 106a, 106b decreases, the power management subsystem 112 can rebalance the power consumption of the remote units 106a, 106b, 106c.

In some aspects, the power management subsystem 112 can be included in the unit 104. For example, as depicted in FIG. 1, the power management subsystem 112 can include a measurement module 114 and an optimization module 116 that are included in or communicatively coupled to the unit 104. In additional or alternative aspects, one or more of the measurement module 114 and the optimization module 116 can include one or more devices that are included in or communicatively coupled to one or more of the remote units 106a, 106b, 106c.

The measurement module 114 can be used to determine or otherwise obtain a utilization metric for one or more of the remote units 106a, 106b, 106c. The measurement module 114 can determine or otherwise obtain a utilization metric based on monitoring system traffic in the DAS 102. The optimization module 116 can be used to determine whether one or more remote units 106a, 106b, 106c are underutilized based on the utilization metric. The optimization module 116 can configure the DAS 102 to operate in a low-power mode based on determining that one or more remote units 106a, 106b, 106c are underutilized. For example, the optimization module 116 can be used to configure one or more of the remote units 106a, 106b, 106c into a low-power mode when the remote unit is underutilized.

In some aspects, the measurement module 114 can include or utilize information received from one or more measurement receivers. A measurement receiver can be used to monitor traffic in the DAS 102 to determine whether one or more of the remote units 106a, 106b, 106c are underutilized. In some aspects, the measurement receiver can be included in or communicatively coupled to the unit 104. For example, the measurement receiver can be included in or communicatively coupled to a master unit, an extension unit or other intermediary hub, or another suitable device that is communicatively coupled to multiple remote units 106a, 106b, 106c.

Figure 2:
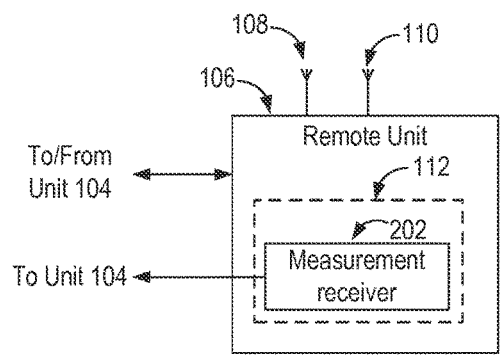
FIG. 2 is a block diagram depicting an example of a remote unit from the DAS that can include a measurement receiver used by the power management subsystem of FIG. 1 according to one aspect of the present disclosure.

In additional or alternative aspects, measurement receivers can be included in or communicatively coupled to the remote units 106a, 106b, 106c. For example, FIG. 2 is a block diagram depicting an example of a remote unit 106 that can include a measurement receiver 202 used in the power management subsystem 112. The measurement receiver 202 can include any device or group of devices suitable for measuring one or more characteristics of signals that are communicated via the DAS 102.

Figure 3:
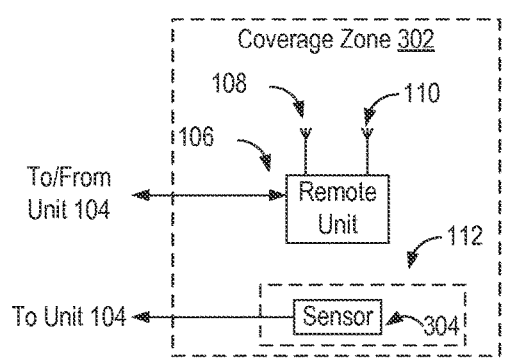
FIG. 3 is a block diagram depicting an example of a remote unit from the DAS that is collocated with a sensor used by the power management subsystem of FIG. 1 according to one aspect of the present disclosure.

In additional or alternative aspects, the measurement module 114 can include or be communicatively coupled to sensors that are used to detect movement or other information in one or more coverage zones serviced by the DAS 102. For example, FIG. 3 is a block diagram depicting an example of a remote unit 106 that is collocated with a sensor 304 used by the power management subsystem 112. The sensor 304 can be used to detect activity in a coverage zone 302 serviced by the remote unit 106. For example, the sensor 304 can be used to determine whether the coverage zone 302 is occupied. The presence or absence of sensed objects or activities can be used by the power management subsystem 112 to determine whether full-power coverage is desirable (e.g., when the coverage zone 302 is occupied) or low-power coverage is desirable (e.g., when the coverage zone 302 is unoccupied). Examples of a sensor 304 include a proximity sensor, a motion sensor, an ultrasonic sensor, a radio frequency identification ("RFID") scanner or sensor for scanning or receiving RFID signals from RFID tags or badges, a radar-based sensor, a thermal sensor, etc.

In some aspects, the sensor 304 can be separate from the remote unit 106, as depicted in FIG. 3. The sensor 304 can be communicatively coupled to the unit 104 or another device that includes the power management subsystem 112. Data indicative of activity levels or other information in the coverage zone 302 can be transmitted or otherwise provided from the sensor 304 to the power management subsystem 112. In additional or alternative aspects, the sensor 304 can be included in or communicatively coupled to the remote unit 106. The remote unit 106 can transmit or otherwise provide data obtained from the sensor 304 to the power management subsystem 112. For example, data obtained from the sensor 304 can be transmitted via a communication link between the remote unit 106 and the unit 104.

Figure 4:
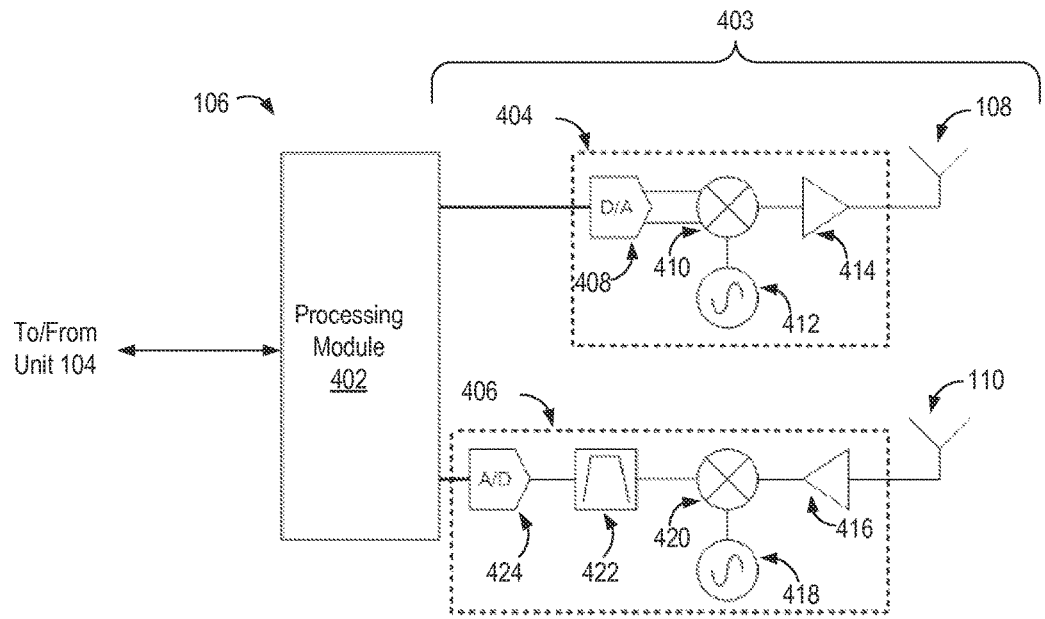
FIG. 4 is a partial schematic diagram depicting an example of a remote unit that can be configured for low-power operation using the power management subsystem of FIG. 1 according to one aspect of the present disclosure.

The remote unit 106 can include one or more transceivers having radio frequency ("RF") processing devices. For example, FIG. 4 is a partial schematic diagram depicting an example of a remote unit 106 that can be configured for low-power operation using the power management subsystem 112. The remote unit 106 can include one or more processing modules 402 and one or more transceivers 403. The processing module 402 can be used to perform digital signal processing of downlink signals and uplink signals communicated by the remote unit 106. The processing module 402 can include one or more of a field-programmable gate array ("FPGA"), a digital signal processer ("DSP"), and any other device or group of devices suitable for processing digital downlink signals and digital uplink signals.

The transceiver 403 can include one or more downlink RF processing paths 404 and one or more uplink RF processing paths 406. A downlink RF processing path 404 can include a digital-to-analog converter 408, a mixer 410, a local oscillator 412, and a power amplifier 414. The digital-to-analog converter 408 can convert digital downlink signals into analog signals. In some aspects, the downlink signals can have an intermediate frequency ("IF") used by the processing module 402. The mixer 410 and the local oscillator 412 can be used to up-convert the IF downlink signals to RF downlink signals for transmission to terminal devices. The power amplifier 414 can be used to increase the gain of RF downlink signals for transmission to terminal devices via one or more transmitter antenna elements 108.

An uplink RF processing path 406 can include a low-noise amplifier 416, a local oscillator 418, a mixer 420, a filter 422, and an analog-to-digital converter 424. The low-noise amplifier 416 can increase the gain of uplink signals received via one or more receiver antenna elements 110. The local oscillator 418 and the mixer 420 can be used to down-convert the uplink signals from RF to IF for processing by the processing module 402. The filter 422 can filter the IF uplink signals. The analog-to-digital converter 424 can convert analog uplink signals to digital uplink signals for processing by the processing module 402.

For illustrative purposes, FIG. 4 depicts a single transceiver 403 having a single downlink RF processing path 404 and a single uplink RF processing path 406. However, a remote unit 106 can include any number of transceivers 403 having any number of downlink RF processing paths 404 and uplink RF processing paths 406.

Figure 5:
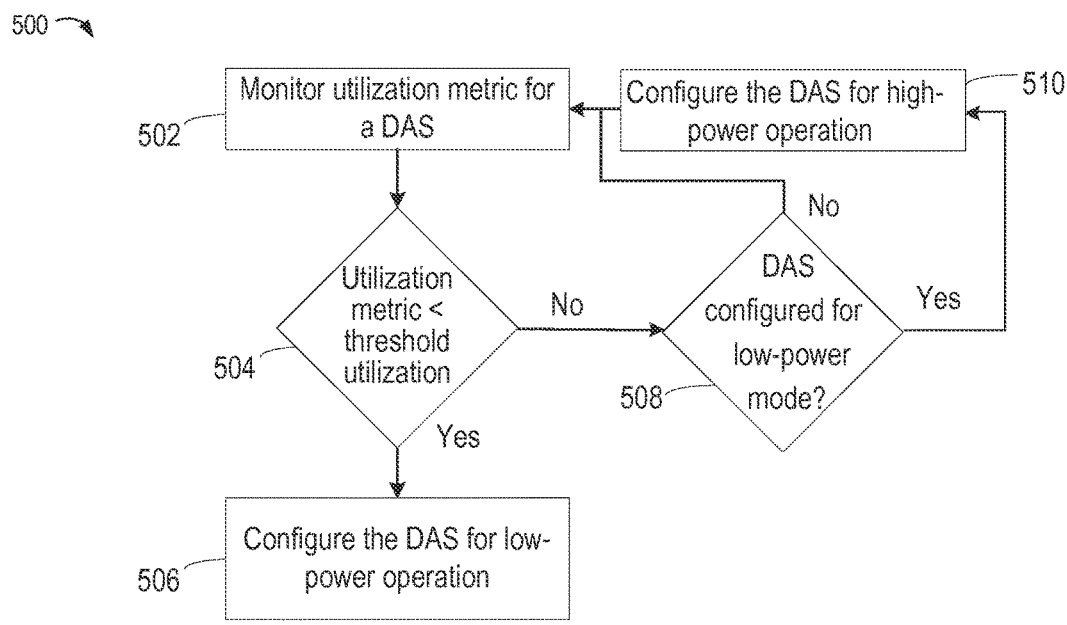
FIG. 5 is a flow chart depicting an example of a process for managing power consumption in a DAS according to one aspect of the present disclosure.

FIG. 5 is a flow chart depicting an example of a process 500 for managing power consumption in a DAS 102 or other telecommunication system. The process 500 is described with respect to one or more of the aspects and examples described above with respect to FIGS. 1-4. Other implementations, however, are possible.

The process 500 involves monitoring a utilization metric for the DAS 102, as depicted in block 502. For example, one or more devices of the power management subsystem 112 can determine or otherwise obtain a utilization metric for the DAS 102. The utilization metric can include data that indicates whether one or more terminal devices are available for communication with one or more remote units. In some aspects, a utilization metric can include data that indicates activity detected by one or more sensors. In one example, a sensor can detect a terminal device. In another example, a sensor can detect the presence of a user who may or may not utilize a terminal device. In additional or alternative aspects, a utilization metric can include data that indicates an amount of bandwidth used by one or more terminal devices. In additional or alternative aspects, a utilization metric can include data that indicates a data rate used by one or more terminal devices.

The power management subsystem 112 can use one or more types of data either alone or in combination to obtain the utilization metric. One example of data used to obtain a utilization metric is data associated with uplink traffic that is measured or otherwise detected by a measurement receiver 202. Another example of data used to obtain a utilization metric is occupancy data obtained by sensor 304 (e.g., a motion sensor, a proximity sensor, a thermal sensor, etc.).

In some aspects, monitoring a utilization metric for the DAS 102 can involve utilizing a measurement receiver to monitor system traffic in the DAS 102. In some aspects, system traffic in the DAS 102 can include uplink traffic received by one or more of the remote units 106a, 106b, 106c. In additional or alternative aspects, system traffic in the DAS 102 can include downlink traffic. One or more measurement receivers can be included in or communicatively coupled to a remote unit 106 (as depicted in FIG. 2), in a master unit or other unit 104, or in an intermediary hub (e.g., an expansion unit) serving several remote units. The utilization metric can be determined from the monitored system traffic. The power management subsystem 112 can determine from the utilization metric whether one or more of the remote units 106a, 106b, 106c are underutilized.

In additional or alternative aspects, monitoring a utilization metric for the DAS 102 can involve using a sensor to detect occupancy information or other activity within a coverage zone of one or more remote units. For example, the power management subsystem 112 can receive and analyze data received from one or more sensors 304 to determine occupancy levels or other activity in serviced coverage zones 302. The occupancy level can be used to obtain the utilization metric, either alone or in combination with other data (e.g., levels of uplink traffic received by remote units). In one example, one or more sensors 304 can be configured to monitor sensors attached to employees or physical assets that may move through a coverage zone 302.

In some aspects, a combination of detected uplink traffic data and detected occupancy data can be used to determine or otherwise obtain a utilization metric. Combining different types of data (e.g., occupancy data and uplink traffic data)

can result in a utilization metric that is indicative of both a terminal device being located in a coverage zone and the terminal device being used for communication in the coverage zone.

In additional or alternative aspects, the power management subsystem 112 can obtain a utilization metric by sensing, detecting, or otherwise determining power consumption levels at specific power delivery points in a location serviced by the DAS 102. For example, an increase in power usage in a coverage zone (e.g., power consumption by lighting devices, power consumption by devices plugged into an outlet, etc.) may indicate that a user is present in the coverage zone. The power management subsystem 112 can use the increase in power consumption to identify or otherwise determine a utilization metric. In one example, the power management subsystem 112 may be coupled to a power delivery system in an area serviced by a DAS 102. The power management subsystem 112 may determine that power is being provided via certain power outlets based on detecting increased electrical power at one or more points in the power delivery system. In another example, the power management subsystem 112 may be communicatively coupled to a server or other head-end unit of a power delivery system in an area serviced by a DAS 102. The power management subsystem 112 may determine that power is being provided via certain power outlets based on communication with the server or other head-end unit of a power delivery system. For example, the power management subsystem 112 may receive data from a head-end unit indicating that power is being provided via certain power outlets based on the head-end unit detecting increased electrical power at one or more points in the power delivery system.

The process 500 also involves determining whether the utilization metric is below a threshold utilization, as depicted in block 504. For example, a processing device included in or used by the power management subsystem 112 can execute one or more algorithms that compare the utilization metric to a threshold utilization. A value for a threshold utilization can be determined, selected, identified, or otherwise obtained in any suitable manner. In some aspects, the value for the threshold utilization can be entered, selected, or otherwise obtained by a user via a suitable interface presented by a computing device. In additional or alternative aspects, the value for the threshold utilization can be automatically determined, identified, or otherwise obtained by a processing device of the power management subsystem 112. For example, the processing device can execute an algorithm for analyzing historical usage conditions for the DAS 102. The processing device can determine a threshold utilization based on the analyzed usage conditions for the DAS 102.

If the utilization metric has a value less than a threshold utilization, the process 500 involves configuring the DAS 102 for low-power operation, as depicted in block 506. For example, utilization metrics for respective remote units 106a, 106b may have values that are greater than the threshold utilization. The power management subsystem 112 can respond to determining that these values of the utilization metrics are greater than the threshold utilization by continuing to operate the remote units 106a, 106b in a high-power mode. Operating the remote units 106a, 106b in a high-power mode can include operating some or all of the communication and processing circuitry included in the remote units 106a, 106b for communicating with one or more terminal devices. The utilization metrics for a remote unit 106c may have a value that is less than the threshold utilization. The power management subsystem 112 can respond to determining that this value of the utilization metric is less than the threshold utilization by configuring the remote unit 106c to operate in a low-power mode. Operating the remote unit 106c in a low-power mode can include operating fewer than all of the communication and processing circuitry included in the remote unit 106c for communicating with one or more terminal devices. Operating a remote unit 106c in a low-power mode can cause the remote unit to consume a lower amount of power than would be consumed by the remote unit 106c being operated in a high-power mode.

If the utilization metric has a value greater than or equal to a threshold utilization, the process 500 involves determining if the DAS 102 is in a low-power mode, as depicted at block 508. If the DAS 102 is not in a low-power mode, the process 500 can return to block 502 and continue monitoring the utilization metric. If the DAS 102 is in a low-power mode, the process 500 involves configuring the DAS 102 for high-power operation, as depicted in block 510. Configuring the DAS 102 for high-power operation can involve reversing or otherwise modifying one or more aspects of the DAS 102 used to configure the DAS 102 for low-power operation as described herein with respect to block 506. The process 500 can return to block 502 and continue monitoring the utilization metric.

Power consumption for a remote unit can be reduced in any suitable manner. In some aspects, configuring the remote unit for the low-power operation can involve deactivating a communication device in the remote unit. One example of a communication device is an antenna element, such as a transmitter element or receiver element. Another example of a communication device is an RF signal processing device. For example, configuring a remote unit 106 for low-power operation can involve deactivating one or more devices included in one or more of the downlink RF processing path 404 and the uplink RF processing path 406.

In some aspects, a remote unit 106 can be configured for low-power operation by deactivating one or more of the number of transmitter antenna elements 108 and the number of receiver antenna elements 110 in a remote unit 106 or otherwise reducing the number of antenna elements that are used by the remote unit 106 for communicating with terminal devices. In one example, the number of antenna elements used for MIMO operation can be reduced (e.g., from a four-by-four MIMO configuration to a two-by-two MIMO configuration). In another example, a remote unit 106 can be switched from a MIMO mode to a SISO mode. The MIMO mode can involve utilizing multiple antenna elements and the SISO mode can involve utilizing a single antenna element for transmission and reception or otherwise using fewer than all of the antenna elements used in the MIMO mode. Reducing the number of transmitter antenna elements 108 and the number of receiver antenna elements 110 that are used for communicating with terminal devices can reduce power consumption by the remote unit 106. The power management subsystem 112 may subsequently determine that additional signal coverage is desirable in a coverage zone (e.g., by determining that a previously unoccupied coverage zone has become occupied). The power management subsystem 112 can configure the remote unit 106 to increase one or more of the number of transmitter antenna elements 108 and the number of receiver antenna elements 110 that are used for communicating with terminal devices in response to determining that additional signal coverage is desirable.

In additional or alternative aspects, configuring a remote unit 106 for low-power operation can involve reducing the power consumed by a power amplifier 414 in the remote unit 106. For example, the remote unit 106 may be configured to reduce the bias voltage for the power amplifier 414. Reducing the bias voltage of the power amplifier 414 can allow the remote unit 106 to remain active and allow new calls or data requests to be initiated, while still saving power. For example, the maximum composite output power can be reduced, thereby lowering capacity and power consumption without reducing the coverage area. In some aspects, reducing the bias voltage of the power amplifier 414 can allow the gain of the power amplifier to remain the same. For some telecommunication standards (e.g., LTE or CDMA), pilot power can remain the same, and thus the coverage radius can be unaffected. Reducing the bias voltage of the power amplifier 414 can reduce power consumption by the remote unit 106 without decreasing signal coverage provided by the remote unit 106 below a desirable level. In some aspects, the remote unit 106 may be configured to reduce the power consumed by a power amplifier 414 by powering down one or more parallel downlink RF processing paths 404 or using a lower power device. The power management subsystem 112 may subsequently determine that additional signal coverage is desirable in a coverage zone (e.g., by determining that a previously unoccupied coverage zone has become occupied). The power management subsystem 112 can configure the remote unit 106 to increase the power consumed by a power amplifier 414 in response to determining that additional signal coverage is desirable.

In additional or alternative aspects, configuring a remote unit 106 for low-power operation can involve reducing the number of RF bands for which coverage is provided. For example, a remote unit 106 may have multiple transmit and receive signal paths. Having multiple transmit and receive signal paths can allow the remote unit 106 to operate in multiple bands simultaneously. The remote unit 106 can operate in a low-power mode by suspending coverage for one or more of RF bands (e.g., by not providing service in those RF bands during a given time period). Suspending coverage for one or more of RF bands can allow the remote unit 106 to deactivate devices in corresponding receive and transmit paths. Reducing the number of RF bands for which coverage is provided can thereby reduce or eliminate power consumption by RF components in the deactivated receive and transmit paths. Reducing the number of RF bands for which coverage is provided can also reduce power consumed by signal processing components (e.g., an FPGA, a DSP, etc.) in the processing module 402.

In additional or alternative aspects, configuring a remote unit 106 for low-power operation can involve deactivating or reducing power consumption by the transceiver 403 of the remote unit 106. For example, a remote unit 106 can deactivate or reduce power consumption by transmitters and receivers in the transceiver 403 during a low-power mode. In the low-power mode, the remote unit 106 can operate one or more devices used for communicating with the power management subsystem 112.

In some aspects, the remote unit 106 can subsequently activate or increase power consumption by transmitters and receivers in the transceiver 403 in response to receiving a command from the power management subsystem 112 to increase signal coverage by the remote unit 106. In additional or alternative aspects, the remote unit 106 can activate or increase power consumption by transmitters and receivers in the transceiver 403 in response to obtaining data from one or more sensors 304 that indicates the presence of potential users. In additional or alternative aspects, the remote unit 106 can activate or increase power consumption by transmitters and receivers in the transceiver 403 in response to a scheduling algorithm indicating that the remote unit 106 should enter a high-power mode.

In additional or alternative aspects, configuring a remote unit 106 for low-power operation can involve deactivating circuitry that is not used for detecting terminal devices in a coverage zone serviced by a remote unit 106. For example, a remote unit 106 that includes a transceiver 403 and one or more of a measurement receiver 202 and a sensor 304 may be operated in a low-power mode in which the transceiver 403 is deactivated and one or more of the measurement receiver 202 and the sensor 304 are active. In some aspects, an amount of circuitry of the remote unit 106 can be activated that is sufficient for identifying activity on a limited number of frequency bands or a limited number of technologies. The remote unit 106 can communicate data to a unit 104 used to manage power consumption in one or more coverage zones during inactive periods. The remote unit 106 can communicate the data based on a detection of information indicative of a terminal device being in the coverage zone (e.g., a detection of uplink traffic by a measurement receiver 202, a detection of motion by a sensor 304, etc.).

In some aspects, circuitry that is used for determining the presence of terminal devices in a coverage zone may be limited to a measurement receiver 202 and a processing device in the remote unit 106. The processing device in the remote unit 106 can be powered at a level that is sufficient for analyzing data obtained using the measurement receiver 202. In additional or alternative aspects, circuitry that is used for determining the presence of terminal devices in a coverage zone may be limited to a sensor 304 and a processing device in the remote unit 106. The processing device in the remote unit 106 can be powered at a level that is sufficient for analyzing data obtained using the sensor 304. In additional or alternative aspects, circuitry that is used for determining the presence of terminal devices in a coverage zone may be limited to one or more of measurement receiver 202 and a sensor 304, transmitter circuitry for transmitting data via a communication link to a remote processing device of the power management subsystem 112 from one or more of measurement receiver 202 and a sensor 304, receiver circuitry for receiving a control signal via a communication link from a remote processing device of the power management subsystem 112, and a processing device in the remote unit 106. The processing device in the remote unit 106 can be powered at a level that is sufficient for receiving a control signal from the remote power management subsystem 112 and configuring the remote unit 106 to switch to a high-power mode in response to receiving the control signal.

In additional or alternative aspects, configuring a remote unit 106 for low-power operation can involve powering some or all of the circuitry of the remote unit 106 for specified time intervals. A time interval may be periodic or pseudo-random. The time interval can be controlled by a timer that is used by a processing device in the remote unit 106. If data indicative of a terminal device being in the coverage zone (e.g., uplink traffic measured by a measurement receiver 202, data detected by a sensor 304, etc.) is detected during this interval, the processing device of the remote unit 106 can reset the timer. Resetting the timer in response to detecting data indicative of a terminal device being in the coverage zone can allow the remote unit 106 to remain in a high-power state if terminal devices are in a coverage zone serviced by the remote unit 106. If the timer expires (e.g., no uplink traffic detected or sensor activity is detected in the time period corresponding to the timer), some or all of the circuitry of the remote unit 106 can be deactivated for a first time interval and activated for a second time interval subsequent to the first time interval. The second time interval may be shorter in duration than the first time interval. In some aspects involving telecommunication systems using one or more of multiple frequency band or multiple telecommunication technologies, a remote unit 106 can cycle through high-power and low-power modes in a manner that is specific for each frequency band or each technology.

The time interval for which a remote unit 106 is activated can be sufficiently long for detecting uplink traffic or other data indicative of a terminal device being in a coverage zone serviced by the remote unit 106. For example, the remote unit 106 can be activated for a period of time sufficient for a terminal device to discover the remote unit 106 and initiate a call or other transmission via the remote unit 106. In some aspects, the remote unit 106 can be activated in accordance with a specified frequency (e.g., once every one or two seconds, once per hour, etc.) and the period of activation can be much shorter than the frequency of activation (e.g., several milliseconds, several minutes, etc.).

In some aspects, different remote units 106a, 106b, 106c can be operated using different frequencies of activation. For example, a remote unit 106a may be used to provide a minimum coverage level for a coverage zone and may be activated more frequently than remote units 106b, 106c that are used to provide more extensive coverage for larger numbers of terminal devices.

In additional or alternative aspects, the power management subsystem 112 can utilize learning algorithms to differentiate between cases in which the presence of terminal devices necessitate a remote unit 106 entering a high-power mode and cases in which the presence of terminal devices do not necessitate the remote unit 106 entering a high-power mode (e.g., terminal devices being present in a coverage zone but not being used by a user). For example, the power management subsystem 112 may detect terminal devices such as mobile phones or tablet computers that have been left in a coverage zone by a user (e.g., overnight).

In some aspects, the power management subsystem 112 may use learning algorithms to monitor for certain frequency bands or technologies associated with signal traffic that is more likely to be used by a user during a certain time period (e.g., mobile phones) and may disregard other frequency bands or technologies associated with signal traffic that is less likely to be used by a user during a certain time period (e.g., laptop computers). For example, a given terminal device (e.g., tablet computer using an LTE technology) may periodically transmit signals at fixed intervals during a period (e.g., checking for e-mail). The power management subsystem 112 may determine that the terminal device having a certain network identifier transmits signals using only the fixed intervals and does not transmit signals outside these intervals. The power management subsystem 112 may determine this transmission behavior is indicative of a terminal device that is not being operated by a user in the coverage zone. The power management subsystem 112 may respond to determining that the terminal device is not being used in a coverage zone by disregarding signal traffic from this terminal device when determining whether to configure one or more remote units in the coverage zone for high-power operation.

In additional or alternative aspects, configuring the DAS 102 for low-power operation can involve reducing a number of channels used by one or more devices in the DAS 102 for communicating with terminal devices or other devices. For example, a number of channels used by the remote unit 106 to communicate with terminal devices can be reduced. Reducing the number of channels that are used for transmission can reduce the amount of signal processing performed by the remote unit 106. Reducing the amount of signal processing performed by the remote unit 106 can reduce the amount of power consumed by one or more signal processing devices (e.g., an FPGA, a DSP, a controller integrated circuit) in the processing module 402. Additionally or alternatively, a number of channels used by the unit 104 to communicate with the remote units 106a, 106b, 106c can be reduced.

In additional or alternative aspects, reducing power consumption in the DAS 102 can involve deactivating or reducing power consumption by individual remote units entirely. For example, depending on the system configuration or building usage patterns, it may be acceptable to deactivate some remote units entirely if one or more suitable criteria (e.g., schedule-based criteria, sensor-based criteria, uplink traffic criteria, etc.) have been satisfied. For example, if the power management subsystem 112 determines that a given coverage zone is unoccupied, the power management subsystem 112 can cause one or more remote units in the center of the coverage zone to be deactivated and allow one or more remote units along the periphery of the coverage zone to continue monitoring for activity. The power management subsystem 112 can reactivate the remote units in the center of the coverage zone in response to the remote units along the periphery of the coverage zone detecting activity indicative of potential network users entering the coverage zone. Additionally or alternatively, a first set of remote units in a first portion of a serviced area (e.g., a first floor of a serviced building) can be deactivated at specified times of day while a second set of remote units in a second portion of a serviced area (e.g., a second floor of the serviced building) remain fully operational. Additionally or alternatively, remote units can be deactivated or otherwise configured for low-power operation in an alternating pattern (e.g., an "on-off, on-off" pattern in which every other remote unit is deactivated). For some modulation types, the coverage radius of individual remote units 106 can be higher under light loading conditions. Having fewer terminal devices being serviced by the DAS 102 may result in a lower total noise floor for any individual user to overcome.

In some aspects, one or more remote units 106 or other access points can be designated to operate in a high-power mode during a period in which other remote units or access points in the same coverage zone are configured to operate in a low-power mode. For example, a remote unit 106 that is designated to operate in a high-power mode may be located at ingress points. An ingress point may be a location in a building or other area serviced by the DAS 102 that a user of terminal device must traverse before moving to other locations in the building or other area serviced by the DAS 102. Examples of ingress points include entrances to buildings, boundaries of a cell or coverage zone, etc. The remote unit 106 that monitors an ingress point can transmit or otherwise provide data to the power management subsystem 112 that is indicative of a terminal device approaching or traversing the ingress point. In some aspects, the data can be a message generated by a processing device of the remote unit 106. The processing device can execute an algorithm for determining that the terminal device is present based on the detected uplink traffic or sensor data and generating the message to notify the power management subsystem 112 of the presence of the terminal device. In other aspects, the data can be sensor data or uplink traffic that is transmitted to the power management subsystem 112 by the remote unit 106 over a communication link. The power management subsystem 112 can execute an algorithm that determines that the terminal device is present based on the detected uplink traffic or sensor data received from the remote unit 106. In some aspects, the power management subsystem 112 may be remote from the remote unit 106 and accessed via a communication link in the DAS 102. In additional or alternative aspects, the power management subsystem 112 may be included in the remote unit 106 and may receive data from one or more of a measurement receiver 202 and a sensor 304 via an internal data bus in the remote unit 106.

The power management subsystem 112 can respond to obtaining the data that is indicative of a terminal device approaching or traversing the ingress point by configuring one or more additional remote units in the coverage zone to switch from a low-power mode to a high-power mode. In some aspects, the additional remote units can be all of the remote units servicing the coverage zone. In other aspects, the additional remote units can be limited to the remote units that are adjacent to or otherwise geographically located close to the remote unit that monitors the ingress point. In some aspects, one or more of the additional remote units can remain in the high-power mode based on detecting the uplink traffic or sensor data indicating that the terminal device is near the additional remote units. The additional remote units may switch back to the low-power mode based on an absence of uplink traffic or sensor data indicating that the terminal device is near the additional remote units.

In some aspects, the power management subsystem 112 can utilize data received from a base station 101 to determine whether to configure one or more of the remote units 106a, 106b, 106c for high-power operation. For example, a unit 104 that is communicatively coupled to a base station 101 may receive data from the base station 101 regarding the location of a terminal device. A power management subsystem 112 included in or communicatively coupled to the unit 104 can determine from the location of the terminal device that the terminal device is near one or more coverage zones of the DAS 102. The power management subsystem 112 can respond to determining that the terminal device is near one or more coverage zones of the DAS 102 by configuring one or more of the remote units 106a, 106b, 106c to switch to a high-power mode.

In additional or alternative aspects, the data indicative of terminal devices being in a coverage zone can be used for controlling the power of additional devices. In one example, the data indicative of terminal devices being present in or absent from a coverage zone can be used for operating security-related devices, such as by activating intrusion detection devices, closed-circuit cameras, camera recording, or other security features in response to determining that terminal devices are absent from a coverage zone. In another example, the data indicative of terminal devices being present in or absent from a coverage zone can be used for temperature control systems. In some aspects, the power management subsystem 112 can directly control additional devices using this data. In additional or alternative aspects, the power management subsystem 112 can transmit this data to servers or other control systems that directly control additional devices.

In additional or alternative aspects, configuring the DAS 102 for low-power operation can involve reducing power consumption by the unit 104. For example, a unit 104 may provide multiple services in the DAS 102, such as communicating with the remote units 106a, 106b, 106c as well as communicating with one or more servers in an area serviced by the DAS 102. The unit 104 can be configured to deactivate one or more services that are not expected to be used during specified time periods or during time periods corresponding to a utilization metric being below a threshold utilization.

In additional or alternative aspects, the power management subsystem 112 can execute one or more scheduling algorithms that can be used for configuring at least of some of the remote units 106a, 106b, 106c for low-power operation based on a schedule. The schedule can, for example, include one or more low-utilization periods. Examples of a low-utilization period include time periods in which reduced amounts of coverage are needed, time periods in which lower data rates are acceptable according to observed or detected historical conditions, etc. An example of a time period when less coverage is needed or when lower data rates are acceptable can include times when a stadium, a building, or another area serviced by a DAS 102 is not in use or when a particular floor of an office building or other structure is unoccupied. In some aspects, the power management subsystem 112 can use a scheduling algorithm in combination with one or more operations described above with respect to the method 500. For example, the power management subsystem 112 can use one or more of measurement receivers 202 and sensors 304 to manage power consumption during normal business hours, and the power management subsystem 112 can deactivate some or all remote units 106a, 106b 106c of the DAS 102 during non-business hours.

In some aspects, the power management subsystem 112 can track total energy savings (e.g., as compared to a full-coverage, full-rate DAS running full-time) and report the results. For example, the energy savings can be reported using any suitable metrics, such as (but not limited to) kilowatt-hours saved, tons of carbon emissions avoided, estimated cost savings, etc.

Although FIGS. 1-5 are described above for a DAS 102, a power management subsystem 112 can be used in any telecommunication system having multiple transceiver devices or other signal radiating points. For example, a power management subsystem 112 can be used to manage power for a telecommunication system that includes multiple macro-cell base stations, multiple small-cell base stations, multiple remote radio heads, etc. The power management subsystem 112 can be used to manage power consumption in telecommunication systems involving distributed communication with a higher propensity for imbalance of use (e.g., buildings or other structures in which usage may be higher in certain locations during certain time periods and lower in those locations during other time periods).

In addition to configuring the DAS to operate in a lower power state under certain conditions, the subject matter described herein also provides for power saving of a base station that serves the DAS 102. The power consumption of base stations that serve the DAS 102 can be a substantial part of the overall power consumption. The DAS 102 can monitor and dynamically route traffic to areas based on utilization or other criteria. For example, a large building might have a base station sector allocated for each floor to handle a peak traffic condition. A ten-story building might have ten base station sectors dedicated to the DAS 102. During nights, weekends, or other times of non-peak occupancy, the building may only need the capacity of a single sector to process the traffic generated by users in the DAS 102. The DAS 102 can be configured to monitor traffic usage per floor or per area and dynamically reroute the traffic to designated sectors. The remaining sectors of the base station can be placed in a low-power mode. Placing a portion of the sectors in a low-power mode can save power in the base station hardware as well as the power in the DAS 102. Monitoring traffic utilization, rerouting traffic to designated sectors, and placing some sectors in a low-power mode can be performed for each operator, and may include coordination or communication between the base station 101 and the DAS 102.

Figure 6:
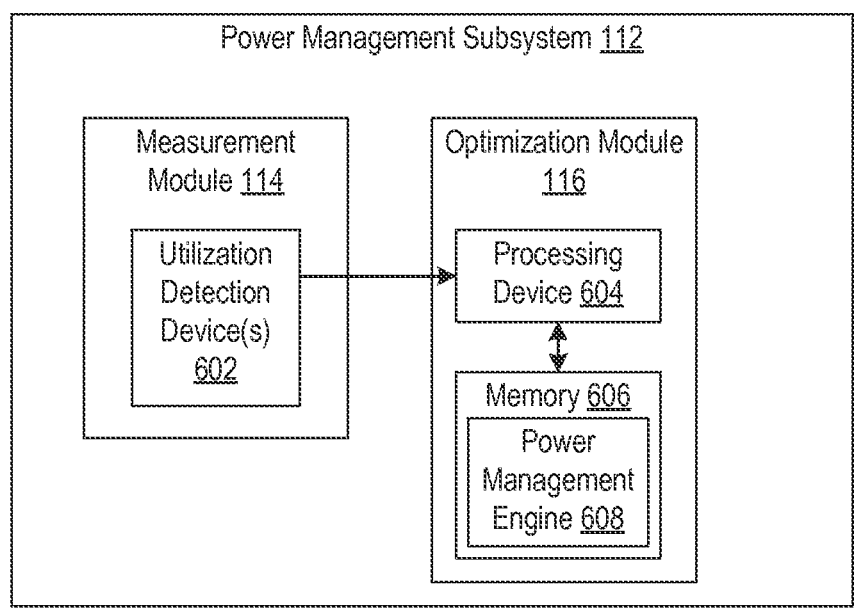
FIG. 6 is a block diagram depicting an example of an implementation for the power management subsystem of FIG. 1 according to one aspect of the present disclosure.

Any suitable device or group of devices can be used to implement the power management subsystem 112. For example, FIG. 6 is a block diagram depicting an example of an implementation of the power management subsystem 112. The power management subsystem 112 can include the measurement module 114 and the optimization module 116. The measurement module 114 can include, for example, one or more utilization detection devices 602 that can be used to detect data indicative of a utilization metric for a remote unit. One example of a utilization detection device 602 is a measurement receiver 202. Another example of a utilization detection device 602 is a sensor 304. In some aspects, the measurement module 114 can include both a measurement receiver and one or more sensors.

The optimization module 116 can include, for example, a processing device 604 and a memory device 606. The processing device 604 can be communicatively coupled to one or more of the utilization detection devices 602 and the memory device 606. The processing device 604 can include any processing device or group of processing devices configured to execute one or more algorithms for managing power consumed by one or more devices in the DAS 102. The processing device 604 can include any device suitable for executing program instructions stored in the memory device 606. Examples of processing device 604 include a microprocessor, an application-specific integrated circuit ("ASIC"), an FPGA, or other suitable processor. The memory device 606 can include, for example, a non-transitory computer-readable medium. The program instructions can include a power management engine 608. The power management engine 608 can include one or more algorithms for managing power consumption by the DAS 102. For example, the power management engine 608 can be executed by the processing device 604 to perform one or more of the operations described above with respect to FIGS. 1-5.

The devices included in the power management subsystem 112 and depicted in FIG. 6 can be included in one or more devices of the DAS 102. In some aspects, the devices included in the power management subsystem 112 and depicted in FIG. 6 can be included in the unit 104. In other aspects, the devices included in the power management subsystem 112 and depicted in FIG. 6 can be included in one or more of the remote units 106a, 106b, 106c. For example, one or more of the processing device 604 and the memory device 606 can be included in or communicatively coupled to a processing module 402 of a remote unit 106. In other aspects, the devices included in the power management subsystem 112 and depicted in FIG. 6 can be included in one or more of the unit 104 and remote units 106a, 106b, 106c.

While the present subject matter has been described in detail with respect to specific aspects and features thereof, it will be appreciated that those skilled in the art, upon attaining an understanding of the foregoing may readily produce alterations to, variations of, and equivalents to such aspects and features. Each of the disclosed aspects, examples, and features can be combined with one or more of the other disclosed aspects, examples, and features. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. method comprising:
monitoring a utilization metric for a remote unit in a telecommunication system, wherein the utilization metric comprises data indicative of one or more terminal devices being available for communication with the remote unit;
determining that the remote unit is underutilized based on the monitored utilization metric; and
configuring the remote unit for a low-power operation in response to determining that the remote unit is underutilized to manage power consumption in the telecommunication system;
wherein the data indicative of the one or more terminal devices being available for communication with the remote unit comprises data indicative of at least one of a bandwidth and a data rate used by the one or more terminal devices.

2. The method of claim 1, wherein determining whether the remote unit is underutilized includes using a sensor to detect activity within a coverage zone in which the remote unit is geographically located, wherein the data indicative of the one or more terminal devices being available for communication with the remote unit comprises data indicative of the activity detected by the sensor.

3. The method of claim 2, wherein the sensor comprises at least one of an RFID scanner, a proximity sensor, a motion sensor, an ultrasonic sensor, and a radar sensor.

4. The method of claim 1, wherein configuring the remote unit for the low-power operation comprises deactivating a communication device in the remote unit.

5. The method of claim 4, wherein deactivating the communication device in the remote unit comprises deactivating at least one antenna element.

6. The method of claim 4, wherein deactivating the communication device in the remote unit comprises switching the remote unit from a multiple-input/multiple-output mode utilizing a plurality of antenna elements to a single-input/single-output mode utilizing fewer than all of the plurality of antenna elements.

7. The method of claim 4, wherein deactivating the communication device in the remote unit comprises deactivating at least one RF signal processing device in an uplink path or a downlink path of the remote unit.

8. The method of claim 1, wherein configuring the remote unit for the low-power operation comprises reducing a number of frequency channels used by the remote unit for wirelessly communicating with the one or more terminal devices.

9. The method of claim 1, wherein configuring the remote unit for the low-power operation comprises reducing power usage by a power amplifier for transmitting signals by the remote unit.

10. A method comprising:
monitoring a utilization metric for a remote unit in a telecommunication system, wherein the utilization metric comprises data indicative of one or more terminal devices being available for communication with the remote unit;

determining that the remote unit is underutilized based on the monitored utilization metric;

configuring the remote unit for a low-power operation in response to determining that the remote unit is underutilized to manage power consumption in the telecommunication system; and executing a scheduling algorithm for determining that the telecommunication system is operating during a low-utilization period, wherein the monitoring is performed based on determining that the telecommunication system is operating during the low-utilization period.

11. The method of claim 10, wherein the data indicative of the one or more terminal devices being available for communication with the remote unit comprises data indicative of at least one of a bandwidth and a data rate used by the one or more terminal devices.

12. A power management subsystem comprising:
a measurement module configured for monitoring a utilization metric for a remote unit in a telecommunication system, wherein the utilization metric comprises data indicative of one or more terminal devices being available for communication with the remote unit; and
an optimization module configured for:
determining whether the remote unit is underutilized based on the monitored utilization metric; and
configuring the remote unit for a low-power operation in response to determining that the remote unit is underutilized to manage power consumption in the telecommunication system;
wherein the data indicative of the one or more terminal devices being available for communication with the remote unit comprises data indicative of at least one of a bandwidth and a data rate used by the one or more terminal devices.

13. The power management subsystem of claim 12, wherein the measurement module comprises a measurement receiver in a master unit of the telecommunication system and the optimization module comprises a processing device in the master unit, wherein the master unit is communicatively coupleable to the remote unit.

14. The power management subsystem of claim 12, wherein the measurement module comprises a measurement receiver in the remote unit and the optimization module comprises a processing device in a master unit of a distributed antenna system, wherein the master unit is communicatively coupleable to a base station and is communicatively coupled to the remote unit.

15. The power management subsystem of claim 12, wherein the measurement module comprises a sensor configured to detect activity in a coverage zone serviced by the remote unit, wherein the data indicative of the one or more terminal devices being available for communication with the remote unit comprises data indicative of the activity detected by the sensor.

16. The power management subsystem of claim 12, wherein the measurement module comprises at least one of a sensor that is included in or communicatively coupled to the remote unit and a measurement receiver that is included in or communicatively coupled to the remote unit, wherein the optimization module comprises a processing device of the remote unit.

17. The power management subsystem of claim 12, wherein the power management subsystem is configured for obtaining the utilization metric based on signal traffic received by the remote unit in and data from a sensor configured to detect occupancy in a coverage zone serviced by the remote unit.

18. The power management subsystem of claim 12, wherein the optimization module is further configured for:
determining that a terminal device in a coverage zone serviced by the remote unit is not being operated by a user;
excluding, from a determination of the utilization metric, at least some of the signal traffic from the terminal device in response to determining that the terminal device is not being operated by a user.

19. A distributed antenna system comprising:
a plurality of remote units configured for wirelessly communicating with terminal devices in a coverage zone, wherein each remote unit of the plurality of remote units comprises a respective utilization detection device for detecting data indicative of a respective utilization metric for the remote unit, wherein the respective utilization metric comprises data indicative of one or more terminal devices being available for communication with the remote unit; and
a unit communicatively coupleable to a base station and communicatively coupled to the plurality of remote units, wherein the unit is configured for:
monitoring the utilization metrics for the plurality of remote units,
determining whether at least one remote unit of the plurality of remote units is underutilized based on at least one of the monitored utilization metrics, and
configuring the at least one remote unit for a low-power operation in response to determining from the at least one of the monitored utilization metrics that the at least one remote unit is underutilized;
wherein the data indicative of the one or more terminal devices being available for communication with the remote unit comprises data indicative of at least one of a bandwidth and a data rate used by the one or more terminal devices.

20. The distributed antenna system of claim 19, wherein the utilization detection device for detecting data indicative of the respective utilization metric comprises a sensor configured for detecting occupancy in the coverage zone, wherein at least one of the unit and the at least one remote unit is configured for determining the at least one of the monitored utilization metrics from the occupancy in the coverage zone, wherein the data indicative of the one or more terminal devices being available for communication with the remote unit comprises data indicative of the occupancy.

21. The distributed antenna system of claim 19, wherein the utilization detection device for detecting data indicative of the respective utilization metric comprises a measurement receiver configured for detecting uplink traffic in the coverage zone, wherein at least one of the unit and the at least one remote unit is configured for determining the at least one of the monitored utilization metrics from an amount of the uplink traffic in the coverage zone.

* * * * *